Nov. 23, 1965   J. F. SCHUGT   3,218,864
FORCE RATIO APPARATUS
Filed Aug. 7, 1962   2 Sheets-Sheet 1

INVENTOR.
JOSEPH F. SCHUGT
BY Charles J. Ungemach
ATTORNEY

Nov. 23, 1965 J. F. SCHUGT 3,218,864
FORCE RATIO APPARATUS
Filed Aug. 7, 1962 2 Sheets-Sheet 2

INVENTOR.
JOSEPH F. SCHUGT
BY Charles J. Ungemach
ATTORNEY

United States Patent Office 3,218,864
Patented Nov. 23, 1965

3,218,864
FORCE RATIO APPARATUS
Joseph F. Schugt, Minneapolis, Minn., assignor to Honeywell Inc., a corporation of Delaware
Filed Aug. 7, 1962, Ser. No. 215,357
1 Claim. (Cl. 73—407)

This invention relates to followup mechanisms and more particularly to a mechanical device for obtaining indications of the ratio between two pressures.

Mechanical apparatus for obtaining the ratio between two forces or pressures has been known in the prior art but such apparatus has suffered from one or more distinct disadvantages. For example, the force ratio responsive device of the Robert J. Kutzler copending application, Serial No. 432,249, filed May 25, 1954, assigned to the assignee of the present invention, shows a structure wherein forces are applied to a rotatable member. The axis of the rotatable member lies directly under the point of application of forces on the beam and an E transformer or capacitor is affixed to the beam and to the rotatable member so that motion of the beam with respect to the rotatable member produces an output signal which is utilized to rotate the rotatable member and to re-establish the point of application of forces on the beam substantially coincident with the axis of rotation of the rotatable member. It has been found that the E-type pickoff or a capacitor pickoff has certain disadvantages. For example the E transformer or capacitor-type pickoff takes up a considerable amount of room so that when the beam and the rotatable member are rotated to their extremities the pickoff assembly itself interferes structurally with the force producing devices. As a result very low and very high force ratios cannot be measured with the system.

The present invention overcomes this problem with a novel strain gage type pickoff which can be utilized much more closely to the extremities of motion of the apparatus. Furthermore, the present invention provides ratio sensitive apparatus which is much less cumbersome, is lighter in weight, and involves fewer components than the prior art.

Briefly, the invention comprises a bendable member in the form of a strain gage to which forces are applied. The bendable member is mounted on a rotatable member and the axis of rotation of the rotatable member is normally substantially coincident with the point of application of forces. The forces exert opposed bending moments on the bendable member which during a balanced or null condition causes the member to lie in the direction of the resultant of the applied forces. Thereafter variation of the forces cause the member to bend thereby producing an output from the strain gage which output is utilized to cause the rotatable member to turn about the axis in such a direction that the balanced or null condition of the bendable member is again established.

A more complete understanding of the present invention will be obtained upon examination of the following claim and specification when read in light of the drawings of which:

Figures 1, 2:
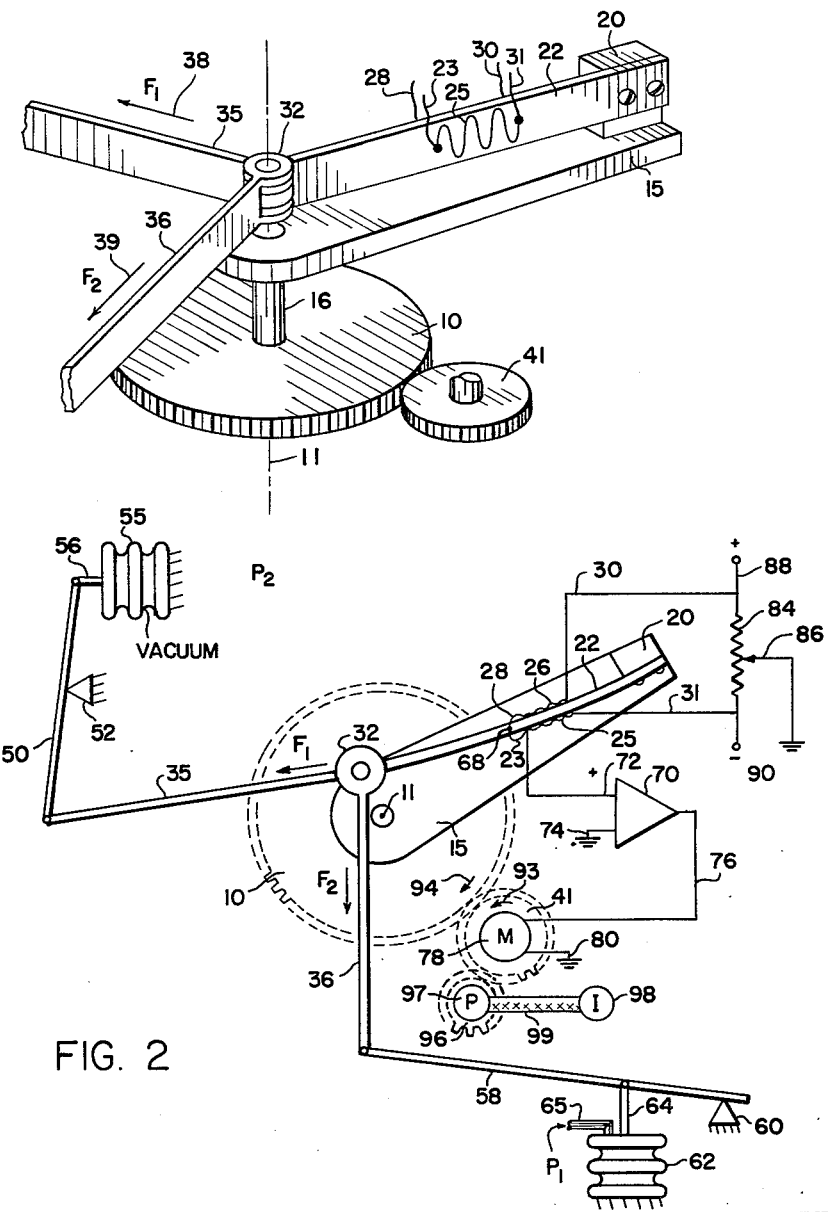
FIGURE 1 is an isometric view of the mechanical structure of the present invention.
FIGURE 2 is a plan view showing the present invention in a nonequilibrium condition.

In FIGURE 1 a gear 10 is shown having an axis 11. A rotatable member 15 is mounted on a shaft 16 attached to gear 10. A mounting block 20 fixed to member 15 carries a bendable member 22 thereon. Bendable member 22 may comprise a slab of high purity silicon, for example, having impurities such as boron defused therein in such a manner that the member 22 becomes a relatively temperature independent strain gage element. The silicon slab may be constructed to have resistive portions on either side of the slab which act to decrease resistance under tension. Therefore, as the member 22 is bent one side thereof is compressed and the other side is extended to provide an output change in resistance twice as great as that obtainable with a single strain gage. Alternately standard wire strain gages may be bonded on opposite sides of a bendable piece of material to obtain the same kind of output although in the present invention the semiconductor type strain gage is preferred. For simplicity the resistive portions of the bendable member 22 have been shown as resistances 25 and 26 respectively having conductors or lead wires 28, 29, 30 and 31 connected thereto. Member 22 has, at its other end, a bracket or connecting yoke 32 to which force exerting members such as straps 35 and 36 are connected. Members 35 and 36 are connected by means not shown in FIGURE 1 to apparatus for producing forces indicative of the ratio which is desired. The yoke 32 on bendable member 22 is normally substantially coincident with the axis 11 and when so coincident member 22 is in a null or balanced position. Preferably this member is straight so that in the balanced condition its longitudinal axis lies along the resultant of the forces $F_1$ and $F_2$.

If the forces $F_1$ and $F_2$ change in such a manner that the resultant thereof no longer lies along the bendable member 22, bendable member 22 will bend thereby placing one of the resistors 25, 26 in compression and the other in tension. This creates an output signal which is utilized by apparatus to be described in connection with FIGURE 2 to turn a gear 41, meshing with gear 10, in such a direction that member 15 is rotated carrying mounting portion 20 and the remote end of bendable member 22 around to a new position wherein member 22 again lies along the resultant of forces $F_1$ and $F_2$ at which time the center of the yoke 32 is again coincident with axis 11. If members 35 and 26 exerting forces $F_1$ and $F_2$ are normally fixed at right angles with respect to each other, then the ratio of these forces is proportional to the tangent of the angle between the resultant and the line of application of one of the forces. Since the longitudinal axis of the bendable member 22 in the balanced or null condition is directed along the resultant of the forces its position is indicative of the angle desired. Suitable characterized means may be provided to remove the tangent function from the position of bendable member 22 so that a final output is obtained directly proportional to the ratio of the forces.

It is of course possible and in some cases desirable to have forces $F_1$ and $F_2$ applied at angles other than 90° with respect to each other. Under such circumstances the angle through which member 22 rotates to establish the null condition is still indicative of the ratio of the forces but a somewhat more complicated trigonometric relationship exists. Suitable characterized means of course may always be provided to remove the trigonometric relationship and hence while the preferred embodiment utilizes a 90° angle between the forces it should be understood that other angles may be more suitable in certain circumstances.

In FIGURE 2 elements similar to those described with regard to FIGURE 1 retain the same reference numeral. The gear 10 is shown upon which is mounted the member 15 and connected to the remote end of member 15 by means of the mounting member 20 is the bendable member 22 which forms a strain gage having resistive portions 25 and 26 thereon. Forces $F_1$ and $F_2$ are applied along members 35 and 36 in FIGURE 2 which forces are derived from pressures $P_1$ and $P_2$ through a linkage arrangement. Member 35 is shown connected to a member 50 which is rotatable about a pivot 52. At the remote end of member 50 a pressure exerting device or bellows 55 is connected by means of a rod 56. Bellows 55 may be evacuated and the whole apparatus may be placed within a container in which a pressure $P_2$ exists. Pressure $P_2$ therefore exerts a force to the right in FIGURE 2 causing member 50 to turn clockwise about pivot 52 and thus pull member 35 to the left to exert force $F_1$ respectively at the center of the yoke 32. Member 36 is shown connected to a member 58 which is rotatable about a pivot 60. A pressure exerting device or bellows 62 is shown in FIGURE 2 connected to member 58 by means of a rod 64. Bellows 62 may have a pressure $P_1$ provided therein by a conduit 65. The pressure $P_2$ operates on the outside of bellows 62 while the pressure $P_1$ operates on the inside and assuming that pressure $P_2$ is greater than $P_1$ a force will be exerted by bellows 62 rotating member 58 counter clockwise around pivot 60. This produces the force $F_2$ on member 36 directed downwardly from the center of yoke 32. In FIGURE 2 the forces $F_1$ and $F_2$ are shown to be exerting a resultant force on member 22 which causes it to bend from the null or balanced condition so that the effective point of application of the force is no longer coincident with the axis 11. The amount of distortion shown in FIGURE 2 is exaggerated for purposes of clarity. Resistor 26 is therefore put in compression and resistor 25 is put in tension which decreases the resistance 26 and increases the resistance 25.

Resistors 25 and 26 are shown having their leads 28 and 23 connected at a junction point 68 which point is connected to one input terminal of an amplifier 70 by means of a conductor 72. The other input terminal of amplifier 70 is shown connected to ground as at 74. The output of amplifier 70 is connected by means of conductor 76 to one of the input terminals of a motor 78 having its other input terminal connected to ground as at 80. Motor 78 is connected to the gear 41 and gear 41 is operable to turn gear 10 as described with regard to FIGURE 1.

Conductors 30 and 31 of resistors 25 and 26 are connected to opposite sides of a resistor 84 having a grounded terminal or wiper 86. The upper portion of resistor 84 is connected to a source of positive voltage by means of conductor 88 and the lower portion of resistor 84 is connected to a source of negative voltage by a conductor 90. Grounded tap 86 is so positioned that when member 22 is in the balanced or null condition there will be no effective voltage between conductor 72 and ground at which time amplifier 70 receives no input. However when the member 22 is bent as shown in FIGURE 2 resistor 26 decreases resistance while resistor 25 increases resistance thereby placing conductor 72 at a positive voltage with respect to ground. This positive voltage causes amplifier 70 to drive motor 78 in a direction shown by arrow 93. This in turn causes gear 10 to rotate in a direction shown by arrow 94 which moves member 15 clockwise. Continued motion of member 15 clockwise brings the effective center of application of forces $F_1$ and $F_2$ back into coincidence with the axis 11 at which time member 22 is unbent and resistors 25 and 26 have their original resistances so that amplifier 70 receives no further input and motor 78 stops. Member 22 then lies along the resultant of forces $F_1$ and $F_2$ and the angular position of member 22 as well as of member 15, gears 10 and 41 and motor 78 is indicative of the ratio of the forces $F_1$ and $F_2$.

In FIGURE 2 motor 78 is also shown turning a gear 96 which is connected to a transmitting device such as potentiometer 97. Potentiometer 97 may be connected to a control device or to an indicator 98 by means of a cable 99. Potentiometer 97 may be characterized so as to remove the tangent function or other trigonometric function so that the signal to indicator 98 is of magnitude indicative of the ratio of forces $F_1$ and $F_2$. Alternately indicator 98 may be calibrated so as to remove the trigonometric function involved or the movement of gear 10 could be produced through a tangent cam or other such characterized device. At any rate indicator 98 is caused to indicate the ratio of the forces as desired. Of course, the ratio of the forces $F_1$ and $F_2$ bears a predetermined relationship to pressures $P_1$ and $P_2$ so that the output from potentiometer 97 is also indicative of a predetermined function of the ratio of these pressures. For example, if it is desired for the device to indicate the Mach number of an aircraft, pressures $P_1$ and $P_2$ are made to be the static and total pressures derived from the pitot tube on the aircraft. Indicator 98 may then be calibrated in terms of Mach number.

Figure 3:
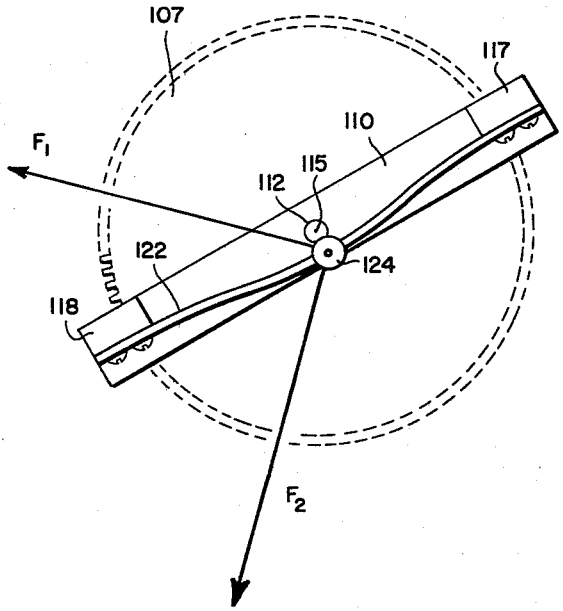
FIGURE 3 is a plan view of an alternate embodiment of the present invention.

FIGURE 3 shows an alternate embodiment of the present invention wherein both ends of the bendable member are rigidly fixed and the forces are applied at a point intermediate the ends. A gear 107 which may be similar to the gear 10 of FIGURE 1 is shown having a member 110 mounted thereon by a shaft 112 which has an axis 115. Member 110 has mounting members 117 and 118 respectively attached at either end. A bendable member 122 is shown connected at both ends to members 117 and 118 respectively. A yoke or connecting means 124 is mounted on bendable member 122 near the intermediate portion and in such a manner that the center thereof normally lies directly above axis 115. The forces $F_1$ and $F_2$ are applied to yoke 124 in a manner similar to that shown in FIGURE 1 and as shown in FIGURE 3 are exerting a bending moment on member 122 to distort it into a shape wherein the point of application of these forces is no longer colinear with axis 115. Strain gage means such as shown with regard to FIGURE 1 may be employed with member 122 to provide a signal to a motor similar to that shown in FIGURE 2 so as to drive gear 107 counter clockwise in FIGURE 3 until the point of application of forces $F_1$ and $F_2$ again becomes colinear with the axis 115. At this time member 122 will again be substantially straight and will be directed along the resultant of forces $F_1$ and $F_2$. The position of gear 107, member 110 and bendable member 122 will then be indicative of the ratio of the forces as previously explained.

The embodiment shown in FIGURE 3 has the advantage of being more stiff than that shown in FIGURES 1 and 2 and consequently will have a higher resonant frequency. This may be desirable and useful in systems which are subjected to high vibration forces. The apparatus of FIGURE 3 being less flexible than that of FIGURES 1 and 2 cannot be bent to such a degree and hence the output signal therefrom will not be as great as that obtainable with FIGURES 1 and 2. However, semiconductor strain gages are available which have very high gage factors so that this is not a great problem.

Figure 4:
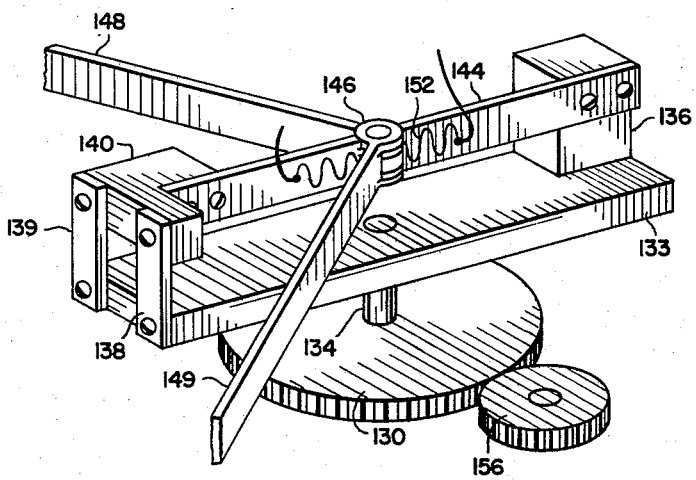
FIGURE 4 is an isometric view of an alternate mounting arrangement for the alternate embodiment of FIGURE 3.

An alternate mounting is shown in FIGURE 4 which increases the amount of flexibility of member 122 but still provides a more rigid system than that shown in FIGURES 1 and 2. As shown in FIGURE 4 a gear 130 carries a member 133 by means of a shaft 134. Member 133 has a mounting member 136 on one end thereof and a pair of flexible straps or bands 138 and 139 connected at the other end thereof. Fexible straps 138 and 139 carry a mounting member 140. A bendable member 144 is shown in FIGURE 4 connected between the mounting member 136 and the mounting member 140 and carries a yoke 146 in a central portion thereof. Forces are applied to the yoke 146 by means of straps 148 and 149 respectively.

As long as member 144 lies along the resultant of the forces applied by straps 148 and 149 the resistance shown by resistor 152 will not change. However, as the forces applied along straps 148 and 149 change, member 144 will bend causing the resistance 152 to change to produce an output operable to drive a gear 156 to turn gear 130 in a manner similar to that described in the previous figures. Because bendable member 144 is mounted by the arrangement shown in FIGURE 4 to mounting member 140 and straps 139 and 138 the forces exerted along straps 148 and 149 have a greater effect thereon. It is seen that as member 144 is caused to bend, mounting member 140 may move by bending of straps 139 and 138 in a direction towards mounting member 136. However, the arrangement of straps allows no motion of mounting member 140 in a direction perpendicular to the direction of strap 144. The embodiment shown in FIGURE 4 may therefore be used as a more or less compromise between the apparatus shown in FIGURES 1 and 3.

Having described my invention in detail, it will be obvious to those skilled in the art that many modifications of the present invention may be made without departing from the spirit of the invention. I therefore do not intend to be limited to the specific disclosures used herein but rather intend only to be limited by the following claim.

I claim:

Apparatus of the class described comprising, in combination:

a first member pivoted about an axis;

a second member having first and second end portions and an intermediate portion;

means connecting the first and second end portions of said second member to said first member on opposite sides of the axis so that the intermediate portion of said second member is substantially coincident with the axis;

means applying a plurality of nonparallel forces to the intermediate portion of said second member, the forces exerting opposed bending moments on said second member, variation of the forces causing said second member to bend so that the intermediate portion moves out of coincidence with the axis;

means connected to said second member to produce an output signal upon bending of said second member, the signal having a first or second characteristic depending upon the direction of bend of said second member;

means connected to said last named means operable in accordance with the output signal therefrom to rotate said first member about the axis in a first or second direction depending upon the characteristic of the output signal so as to reestablish coincidence of the intermediate portion of said second member with the axis; and means connected to the last named means to indicate the ratio of the forces.

References Cited by the Examiner

UNITED STATES PATENTS 2,772,569　12/1956　Ruge _____ 73—398
3,038,339　 6/1962　Colvin _____ 73—407

OTHER REFERENCES

An article entitled "Transducer and Servo System Generate Ratio of Pressures," in Design News, Nov. 15, 1956 (pages 30 and 31).

RICHARD C. QUEISSER, *Primary Examiner.*

JOSEPH P. STRIZAK, *Examiner.*